(12) United States Patent
Choi et al.

(10) Patent No.: US 6,233,690 B1
(45) Date of Patent: May 15, 2001

(54) MECHANISM FOR SAVING POWER ON LONG LATENCY STALLS

(75) Inventors: Lynn Choi, Irvine; Harshvardhan Sharangpani, Santa Clara, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/156,552

(22) Filed: Sep. 17, 1998

(51) Int. Cl.[7] .......................................... G06F 1/32
(52) U.S. Cl. ............................ 713/322; 713/323; 713/601
(58) Field of Search ...................... 713/300–340, 713/600–601; 712/220–224, 216–219, 205–207; 711/118–146, 169

(56) References Cited

U.S. PATENT DOCUMENTS

| | | | | |
|---|---|---|---|---|
| 4,965,717 | * | 10/1990 | Cutts, Jr. et al. ...................... | 714/12 |
| 5,192,914 | * | 3/1993 | Sudo et al. .............................. | 327/34 |
| 5,233,694 | * | 8/1993 | Hotta et al. ........................... | 712/215 |
| 5,392,437 | * | 2/1995 | Matter et al. .......................... | 713/324 |
| 5,442,775 | * | 8/1995 | Whitted, III et al. ............... | 713/601 |
| 5,452,401 | * | 9/1995 | Lin ......................................... | 713/322 |
| 5,452,424 | * | 9/1995 | MacDonald .......................... | 713/601 |
| 5,539,681 | * | 7/1996 | Alexander et al. ................... | 713/321 |
| 5,553,276 | * | 9/1996 | Dean ..................................... | 713/500 |
| 5,666,537 | * | 9/1997 | Debnath et al. ...................... | 713/322 |
| 5,680,641 | * | 10/1997 | Sidman ................................. | 710/20 |
| 5,696,958 | * | 12/1997 | Mowry et al. ........................ | 712/235 |
| 5,713,012 | * | 1/1998 | Tanaka et al. ........................ | 712/233 |
| 5,734,856 | * | 3/1998 | Wang ..................................... | 712/219 |
| 5,918,033 | * | 6/1999 | Heeb et al. ........................... | 712/217 |
| 5,935,253 | * | 8/1999 | Conary et al. ........................ | 713/322 |
| 5,987,620 | * | 11/1999 | Tran ...................................... | 713/600 |

* cited by examiner

*Primary Examiner*—Sumati Lefkowitz
(74) *Attorney, Agent, or Firm*—Leo V. Novakoski

(57) ABSTRACT

A method for gating a clock signal to an execution unit on long latency memory stalls monitors a stall signal, a scoreboard (data) hazard signal, a resource hazard signal, and a data return signal. The clock signal is decoupled from the execution unit when the stall and data hazard signals are asserted for a selected interval and the data return and resource hazard signals are not asserted for a selected interval.

16 Claims, 4 Drawing Sheets

MECHANISM FOR SAVING POWER ON LONG LATENCY STALLS

BACKGROUND OF THE INVENTION

1. Technical Field

This invention relates to power reduction in processor circuits, and in particular to systems and methods for controlling power consumption by execution units.

2. Background Art

Each new generation of semiconductor process technology allows the transistor counts and clocking frequencies of processor chips to increase. With more transistors operating at higher frequencies, processor chips consume significantly more power with each new generation of process technology. The increased power consumption and accompanying heat dissipation create significant design problems. For example, the battery life of mobile systems must be expanded to compensate for the power requirements of new processors, and the thermal solutions required to maintain processor chips within their specified operating temperature ranges become more complex as more heat is generated.

Clock gating is a well-known technique for reducing the power consumed (and dissipated) by processors. The various clock gating techniques decouple a clock signal from different parts of a computer system when certain trigger conditions are detected. When the clock signal is removed, logic in the affected part of the computer system is no longer charged and discharged, thus reducing power consumption. The power dissipated by the clock network itself is also reduced since it drives a smaller portion of the processor system. The overall power savings can be significant.

Various trigger conditions have been employed to gate the clock to different components of processor systems. For example, the clock signal may be decoupled from logic associated with the monitor and peripheral devices when no keyboard or mouse activity (inputs) is detected for a selected interval, e.g. ten minutes. The clock signal is restored to the affected components when an input is detected. At a finer level of control, execution logic within the processor may be decoupled from the clock if it does not detect any incoming instructions to be processed. The execution logic is powered up when an appropriate instruction is detected in the processor pipeline.

The methods employed to accomplish clock gating must not interfere with operation of the processor system. For example, neither data nor instructions can be lost when the system transitions between power on (clock signal coupled) and power off (clock signal deoupled) states. In some cases, this is accomplished by trading performance for power reduction. For example, instruction processing may be delayed following release of the clock gating condition to accommodate the power up latency. The delay ensures that the logic is fully powered before it a, resumes executing instructions. In some cases, additional logic may be used to avoid dropping data or instructions. However, this has its own associated performance and die area costs.

These considerations limit the use of clock gating with certain common stall conditions. For example, cache misses are relatively common for software workloads that have large working sets. Execution resources may be stalled for approximately 30% of their execution time, waiting for data to be returned from higher level memory structures, e.g. storage structures closer to main memory. Gating the clock signal to the execution resources during these stalls could save significant power. However, incurring an additional delay following release of each stall to accommodate the power up latency could lead to substantial performance degradation as well as increased design complexity. In addition, several different conditions can generate stalls of various latencies, making it difficult to identify stalls caused by long latency memory loads. This is further complicated when multiple stall conditions occur at the same time.

The present invention addresses this and other limitations of conventional power reduction techniques.

SUMMARY OF THE INVENTION

A system is presented for gating a processor clock on selected machine stalls. The selected machine stalls are those for which termination of the stall can be anticipated reliably.

In accordance with the present invention, a system for reducing power to execution logic includes a cache unit, a hazard unit, and a gating module. The cache unit monitors a load operation and generates a data return signal in advance of the load return. The hazard unit tracks data status and generates a stall signal when data required by an instruction is not available. The gating module adjusts power to the execution unit according to the state of the data return and stall signals.

For one embodiment of the invention, a clock signal is decoupled from execution logic when a stall on a pending load is detected for a selected interval. The clock signal is restored to the execution logic when a data return is indicated. If the data return does not eliminate the stall condition, the clock signal may be decoupled from the execution logic again.

BRIEF DESCRIPTION OF THE DRAWINGS

The present invention may be understood with reference to the following drawings, in which like elements are indicated by like numbers. These drawings are provided to illustrate selected embodiments of the present invention and are not intended to limit the scope of the invention.

DETAILED DISCUSSION OF THE INVENTION

Figure 1:
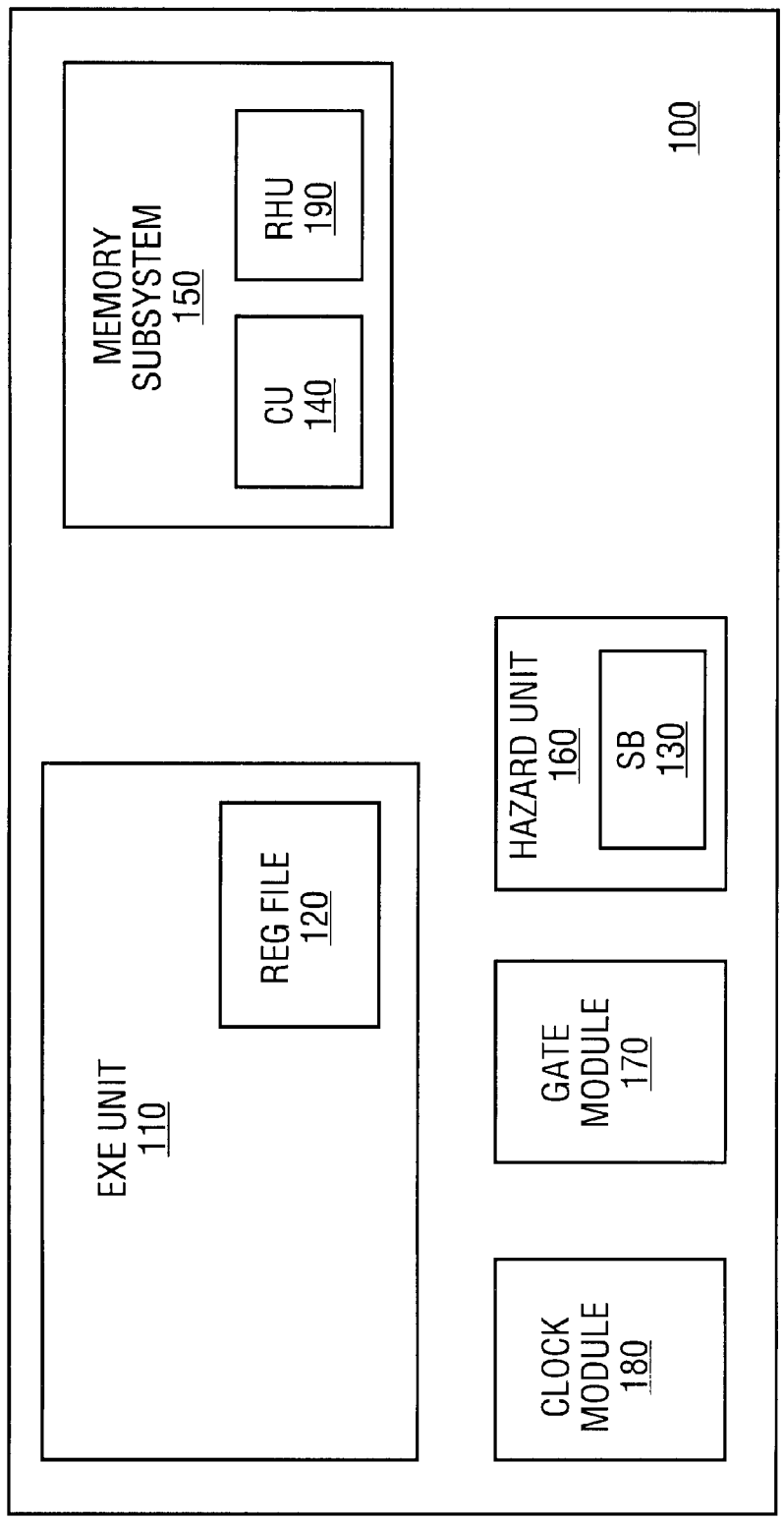
FIG. 1 is a block diagram of a processor including a power management system in accordance with the present invention.

The following discussion sets forth numerous specific details to provide a thorough understanding of the invention. However, those of ordinary skill in the art, having the benefit of this disclosure, will appreciate that the invention may be practiced without these specific details. In addition, various well known methods, procedures, components, and circuits have not been described in detail in order to focus attention on the features of the present invention.

The present invention is a system and method for powering down processor execution logic on long latency machine stalls. Cache misses that require long latency memory accesses are a common source of these stalls. Power adjustments are accomplished by gating a clock signal to targeted logic. Here, gating refers to decoupling the clock signal from the targeted logic to power down the logic and recoupling the clock signal to the targeted logic to power up the logic. The long latency stalls targeted for power reduction are those for which termination of the stall condition can be anticipated reliably. For example, stall termination is anticipated reliably if it is detected with sufficient lead time to allow the power up transition to be overlapped with termination of the stall condition. Power is restored to the execution logic and instruction processing is resumed without any delay to accommodate the power-up latency.

Due to the timing constraints, only selected stalls are suitable for triggering a power reduction. For example, a stall that is created by an interlock on consumption of data from a pending load operation ("a pending load stall") will not be released until the load data is returned from memory and subsequently consumed. For one embodiment of the invention, this stall condition is identified by a hazard unit associated with the execution logic that is interlocked. When a pending load stall is detected, power down is initiated following a selected interval that filters out shorter latency stalls. In this embodiment, a data return signal precedes the earliest release of the stall condition by a known interval. During power down, the data return signal is monitored, and the clock signal is recoupled to the execution logic when the data return signal is asserted. The power-up latency occurs in parallel with and is hidden behind completion of the load return and termination of the machine stall due to the load data interlock.

For one embodiment of the invention, the power-up is done conservatively, and the power up transition is initiated from the power-down state when any data return signal is detected. If the returned load data does not eliminate the stall condition, the clock signal may be decoupled from the execution logic as before. This embodiment avoids the complexity of both identifying the actual register to which a load returns data and determining whether the stall is solely due to an interlock on this data.

For another embodiment of the invention, the clock signal may be restored to the execution logic when events are detected that inhibit accurate prediction of the end of a stall. For example, stalls triggered by unavailable resources (resource stalls) are typically terminated without warning as soon as the resource becomes available. If a resource stall masks the end of a pending load stall, termination of the pending load stall can not be anticipated, and the attendant power up latency can not be overlapped with other operations. To avoid this, a resource stall signal is monitored during a pending load stall and the clock signal is recoupled to the execution logic if the resource stall signal is asserted before the pending load stall is terminated.

FIG. 1 is a block diagram of one embodiment of a processor 100 that implements the clock gating method of the present invention. The disclosed embodiment includes an execution unit 110 and associated register file 120, a memory subsystem 150 and associated cache unit 140, a hazard detection unit 160, a gate module 170, a clock module 180, and a resource hazard unit (RHU) 190. RHU 190 is shown as part of memory subsystem 150, since many resource hazards are generated in this part of processor 100. The disclosed configuration of RHU 190 and any of the other resources in processor 100 is not required to practice the present invention.

In the following discussion, an instruction that reads data from register file 120 is a "consumer" of the data, and an instruction that writes data to register file 120 is a "producer" of the data. An instruction may be a producer of one piece of data and a consumer of another piece of data.

Execution unit 110 implements instructions, using data provided by associated register file 120 or bypassed from memory subsystem 150. Memory subsystem 150 typically includes one or more caches and a main memory which form a hierarchy of data storage structures. Data that is not available in register file 120 is provided from the lowest latency data storage structure of subsystem 150 in which it is found. Memory subsystem 150 may be multi-ported to allow multiple blocks of data to be returned concurrently. For one embodiment, memory subsystem 150 is dual ported.

A scoreboard (SB) 130 tracks the availability of data in register file 120. In the disclosed embodiment, SB 130 is shown as part of hazard detection unit 160, although this configuration is not necessary for the present invention. One embodiment of SB 130 includes a bit (SB bit) for each register in register file 120. An SB bit is set when the associated register is awaiting a data return from memory subsystem 150. If a consumer tries to access the register, hazard detection unit 160 detects the set SB bit and stalls processor 100. The stall suspends processing of the consumer as well as any instructions in the pipelines and queues behind the consumer.

Cache unit (CU) 140 tracks data transfers between memory subsystem 150 and execution unit 1 I0. For one embodiment of the invention, CU 140 maps each outstanding load operation to a register that receives data returned by the load operation. When targeted data is retrieved from memory system 150, CU 140 directs the returned data to the appropriate register. For a dual ported memory subsystem 150, CU 140 generates signals, CuXDataP0 and CuXDataP1, when a load return of data type X is detected on first and second ports, respectively. For example, X may indicate integer or floating point data types.

Clock module 180 provides a clock signal (CLK) to execution unit 110 (or selected components) under control of gate module 170. Typically, clock signals are routed to different regions of processor 100 through a network that is driven by a global clock signal. The network divides the global clock signal into regional clock signals. Each regional clock signal may be further divided to drive local function unit blocks (FUBs) within a region. If execution unit 110 is large, it may extend over multiple clock regions, each of which may include several local units.

Clock module 180 may control a local or regional clock signal to execution unit 110. The time necessary to couple CLK to and decouple CLK from different portions of execution unit 110 depends on whether it is a regional CLK or a local CLK. For one embodiment of the invention, a regional CLK signal has a two cycle latency to power up its associated logic (power up latency), while a local CLK signal has a one cycle power up latency. CLK signals can be gated to their associated execution logic independently. For one embodiment of the invention, execution logic 110 represents portions of a floating point execution unit and clock module 180 gates one or more regional and local CLK signals to portions of the floating point unit under control of gating module 170.

Hazard detection unit 160 determines when a stall condition arises in execution unit 110. For one embodiment of the invention, hazard detection unit 160 monitors SB 130 to determine when a data hazard arises and generates a stall signal when one is detected. Hazard detection unit 160 is discussed in greater detail below.

Gating module 170 monitors signals generated by hazard detection unit 160 and CU 140, and gates CLK to execution unit 110 according to the status of the monitored signals. For the disclosed embodiment, gating module 170 uses clock module 180 to couple the received clock signal to and decouple the received clock signal from execution unit 170. Gating module 170 accounts for any latencies in clock module 180 to ensure accurate handling of data and instructions on power up/down transitions. For one embodiment of the invention, gating module 170 accommodates the latency by monitoring stall/data return signals for a selected interval before gating CLK.

The suitability of different machine stalls for gating CLK depend on the expected latencies of the stalls and the accuracy with which termination of the stalls can be predicted. The latency of a pending load stall depends on which level of memory subsystem 150 stores the targeted data. The higher the level of the storage structure in which the data is found, i.e. the closer it is to main memory, the greater the latency of the data return. The latency may be between 2 and 30 clock cycles for data available in a cache of memory system 150. It may be on the order of 200 clock cycles for data that is only available in main memory. In each case, cache unit 150 detects when the targeted data is located and provides advanced notice that the stall condition is about to terminate.

Other events that trigger machine stalls may be less suitable for clock gating than pending load stalls. For example, a structural or resource hazard may stall processor 100 when instruction processing is held up by availability of a processor resource, e.g. a full load buffer. As noted above, structural stalls are often resolved asynchronously and provide no advanced warning that the stall condition is ending. In addition, the duration of a structural hazard stall is usually much less than that of a pending load stall. For one embodiment of the invention, structural stalls do not trigger clock gating because they provide no opportunity to overlap the power up latency with operations that terminate the resource stall. For another embodiment, CLK is recoupled to the execution logic if a resource stall occurs when the execution logic is powered down, i.e. during a pending load stall.

Figure 2:
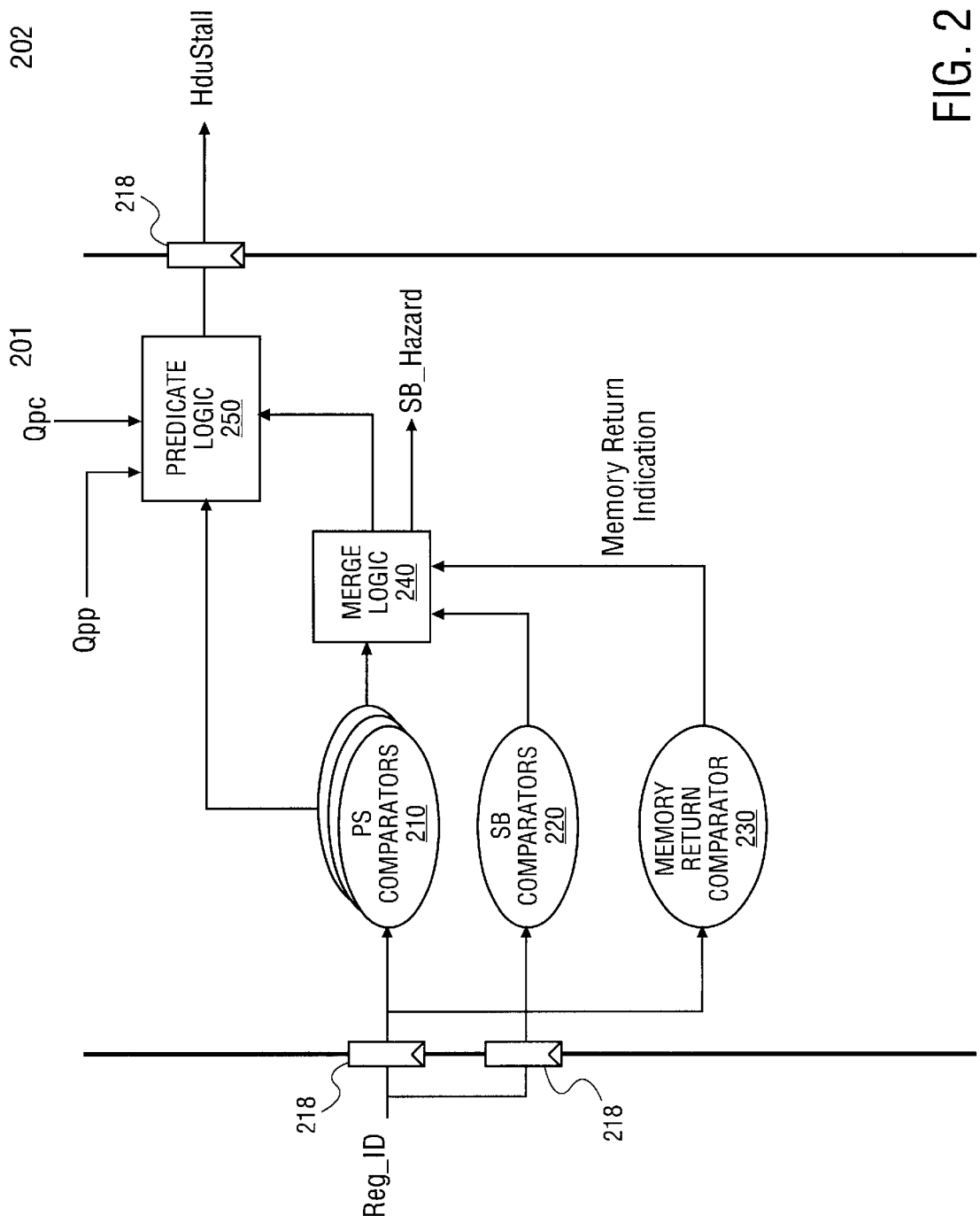
FIG. 2 is a block diagram of one embodiment of a hazard detection unit in the power management system of FIG. 1.

FIG. 2 is a block diagram of one embodiment of hazard detection unit 160 as implemented in a pipeline 200. Pipeline 200 is represented as a series of pipeline stages ("pipe stages") 201, 202 to indicate when different components of hazard detection unit 160 operate. Except as noted, signals propagate from left to right, so that the response of circuitry in, e.g., pipe stage 201 on CLK cycle N is propagated to the circuitry of pipe stage 202 on CLK cycle N+1. Staging latches 218 control the flow of signals between pipe stages 201–202.

The disclosed embodiment of hazard detection unit 160 includes one or more pipe stage comparators 210, a scoreboard (SB) comparator 220, and a load or memory return comparator 230. Each comparator 210 determines whether a data dependency exists between instructions in the synchronous pipeline. This may be done by comparing a source or destination register specified by the consumer in pipe stage 201 with the destination register of a producer that is in a later stage of the synchronous pipeline, e.g. pipe stage 202, and has not yet updated register file 120. If a match is detected, a data dependency exists and a stall may be necessary. For non-load instructions, the data is typically produced within two or three clock cycles and is usually bypassed to the consumer for processing.

SB comparator 220 determines the ready status of registers that are to be updated by data returned from load instructions. If the SB bit corresponding to the source register specified by the consumer in pipe stage 201 is set, a data dependency exists and a stall due to an interlock on this pending load may be necessary. Load comparator 230 checks for matches between the consumer in pipe stage 201 and any incoming load returns which may provide the consumer with the data it needs. This provides a late check to release any dependency indicated by the scoreboard logic.

The remaining components of hazard detection unit 160 determine whether the data dependencies identified by comparators 210, 220, 230 require the pipeline to stall. In the disclosed embodiment of hazard detection unit 160, dependencies identified by comparator(s) 210 and SB comparator 220 are filtered by merge logic 240 to eliminate those that do not lead to stalls. For example, merge logic 240 invalidates any data dependency hazards identified by comparators 210 for which data may be bypassed from the producer to the consumer. In addition, not all instructions use the two source registers and one destination register allocated to them. Merge logic 240 invalidates any data dependency hazard raised by a register that is not used by the both the producer and the consumer. Merge logic 240 also invalidates scoreboard hazards that are eliminated by loads identified through comparator 230.

For one embodiment of the invention, instructions in processor 100 may be predicated, i.e. gated by a predicate value. A predicated instruction updates the architectural state (and generates valid data dependency hazards) only if the corresponding predicate is true. Predicate logic 250 validates each hazard according to whether the predicates of the consumer (Qpc) and producer (Qpp) are true.

For one embodiment of the invention, a SB_Hzd signal is generated at the end of pipe stage 201 if a scoreboard hazard is validated by merge logic 240. Hazards indicated by comparators 210 and 230 may likewise be validated by merge logic 240. If a hazard validated by merge logic 240 is also validated by predicate logic 250, hazard detection unit 160 generates a stall signal, HduStall, in pipe stage 202.

SB_Hzd may be used as a proxy for a pending load stall, provided the instruction that generates SB_Hzd is not predicated. If the instruction is predicated, it is safer to wait until both SB_Hzd and HduStall are asserted, since HduStall is only asserted if the data dependency hazard is validated by predicate logic 250. Concurrent assertion of SB_Hzd and HduStall indicates that the stall is a pending load stall on an instruction that will update the architecture state.

For one embodiment of the invention, RHU 190 (FIG. 1) computes resource stalls during pipe stage 202 and asserts a RhuStall signal in a subsequent pipe stage (not shown). For one embodiment, gating module 170 monitors RHU 190. If a resource stall is asserted by RHU 190 during power down mode, CLK is recoupled to the execution logic. Otherwise, the resource stall might mask the end of a concurrent pending load stall, and unexpected termination of the resource stall could lead to dropped data or instructions during the power up latency.

Table 1 summarizes the signals used to detect long latency machine stalls and their impending terminations for one embodiment of the present invention.

| SIGNAL | SOURCE | INDICATION |
|---|---|---|
| HduStall | hazard detection unit 160 | data hazard for a consumer in stage 201 |
| SB_Hzd | hazard detection unit 160 | data hazard due to interlock on a pending load return |

-continued

| SIGNAL | SOURCE | INDICATION |
|---|---|---|
| CuXDataP0/P1 | Cache unit 140 | data return on the way |
| RhuStall | Resource Hazard Unit 190 | resource stall |

For the embodiment of the invention, gating module 170 decouples CLK from execution logic when (1) HduStall has been asserted for 6 clock cycles, (2) SB_Hzd has been asserted for 6 cycles, (3) RhuStall has not been asserted for 6 cycles and (4) CuXDataP0/P1 have not been asserted for 6 cycles. Gating module 170 recouples CLK to the execution logic when any of conditions 1–4 are not true. The delay (6 clock cycles in the disclosed embodiment) allows enough time for "short" pending load stalls to be filtered before powering down the execution logic. It also accommodates timing constraints such as signal propagation delays. Gating module 170 may employ delays other than 6 clock cycles to filter "short" pending load stalls and other timing constraints, depending on the characteristics of processor 100.

Because the disclosed embodiment of gating module 170 monitors signals over multiple clock cycles, the logic equation representing the power down condition is relatively complex. For example, a straightforward implementation of the transition conditions discussed above provides the following logic equation for the Power_Down condition:

Power_Down=
   [HduStall && delay (HduStall, 1) && delay (HduStall, 2) && delay (HduStall, 3) && delay (HduStall, 4) && delay (HduStall, 5)]&&
   [SB_Hzd && delay (SB_Hzd, 1) && delay (SB_Hzd, 2) && delay (SB_Hzd, 3) && delay (SB_Hzd, 4) && delay (SB_Hzd, 5)]&&
   [!RhuStall && !delay (RhuStall, 1) && !delay (RhuStall, 3) && !delay (RhuStall, 3) && !delay (RhuStall, 4) && !delay (RhuStall, 5)]&&
   [!CuXdata && !delay (CuXdata, 1) && !delay (CuXdata, 2) && !delay (CuXdata, 3) && !delay (CuXdata, 4) && !delay (CuXdata, 5)]

Here, "&&" represents logical AND, "|" represents logical OR, delay (A, N) represents the logic value of signal A, N clock cycles earlier, and "!" indicates negation of the logic value. For a multiported memory subsystem 150, CuXdata is an OR of corresponding signals (CuXdataPY) for each port Y. In the case of an L-ported memory subsystem 150, the CuXdata=[!CuXdataP0 && . . . !CuXdataPL]. Much of this complexity can be removed by staging the logic value from previous clock cycles.

Figure 3:
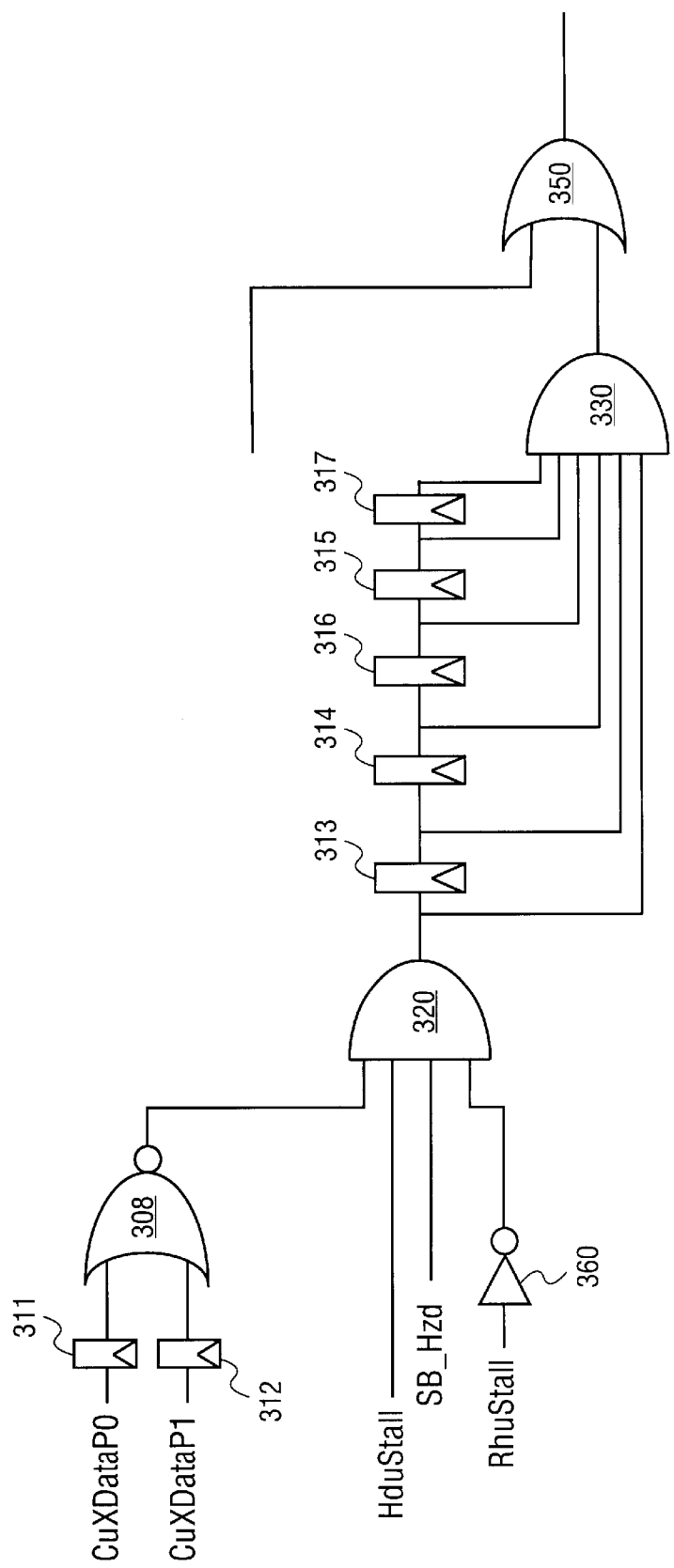
FIG. 3 is a logic diagram of one embodiment of a gating module in the power management system of FIG. 1.

FIG. 3 is a circuit diagram of one embodiment of gating module 170 in accordance with the present invention. The disclosed embodiment of gating module 170 includes flip-flops 311–317, AND gates 320, 330, NOR gate 340, OR gate 350, and inverter 360. Data return signals, CuXDataP0/P1 are coupled to the inputs of NOR gate 340 through staging flip-flops 311 and 312, respectively. The output of NOR 340 disables AND 320 when either data return signal is asserted. HduStall and an inverted version of RhuStall are applied to the other inputs of AND 320. AND 320 asserts its output when (1) there is no pending data return, (2) a scoreboard hazard and a hazard detection unit stall are indicated, and (3) no RhuStall is indicated.

The output of AND 320 is propagated through staging flip-flops 312–317 on subsequent clock cycles. AND 320 and staging latches 312–317 thus provide a history of conditions (1)–(3) over 6 clock cycles. For the disclosed embodiment, AND 330 is asserted only when the three conditions are true for 6 consecutive clock cycles. If any of conditions (1), (2), or (3) becomes false during the interval, the corresponding input to AND 330 goes low, and the interval is restarted. For example, if the conditions are true for three clock cycles and a one clock resource stall is detected on the fourth cycle (RhuStall is true), AND 320 is deasserted and the earliest AND 330 can be asserted high is 6 clock cycles later.

If the disclosed embodiment of circuit 300 is in power down mode and a load return is detected, e.g. CuXDataP1 is asserted, AND 320 is deasserted and circuit 300 transitions to power up mode. If the data return indicated by CuXDataP1 targets an operand source register specified by the consumer instruction that triggered the stall (and subsequent power down transition), HduStall and SB_Hzd will be deasserted subsequently. If the load returns data to a register other than the one specified by the consumer that triggered the stall, the stall is not terminated, and HduStall and SB_Hzd will not be deasserted. In this case, circuit 300 transitions back to power down mode in 6 clock cycles, unless another gate terminating event intervenes. This type of false power up event is expected to occur early in a pending load stall, when left over load operations are still propagating through the processor-memory channel.

The disclosed embodiment of the present invention makes a tentative transition to the power up state on any data return because timing constraints limit the speed at which the target of a load return can be determined. This determination requires comparing the source operand register specified by the consumer with the register gating the stall. If timing constraints are reduced, an alternative embodiment of the invention may include logic to determine whether a data return will terminate a stall condition before the power on transition is made.

Figure 4:
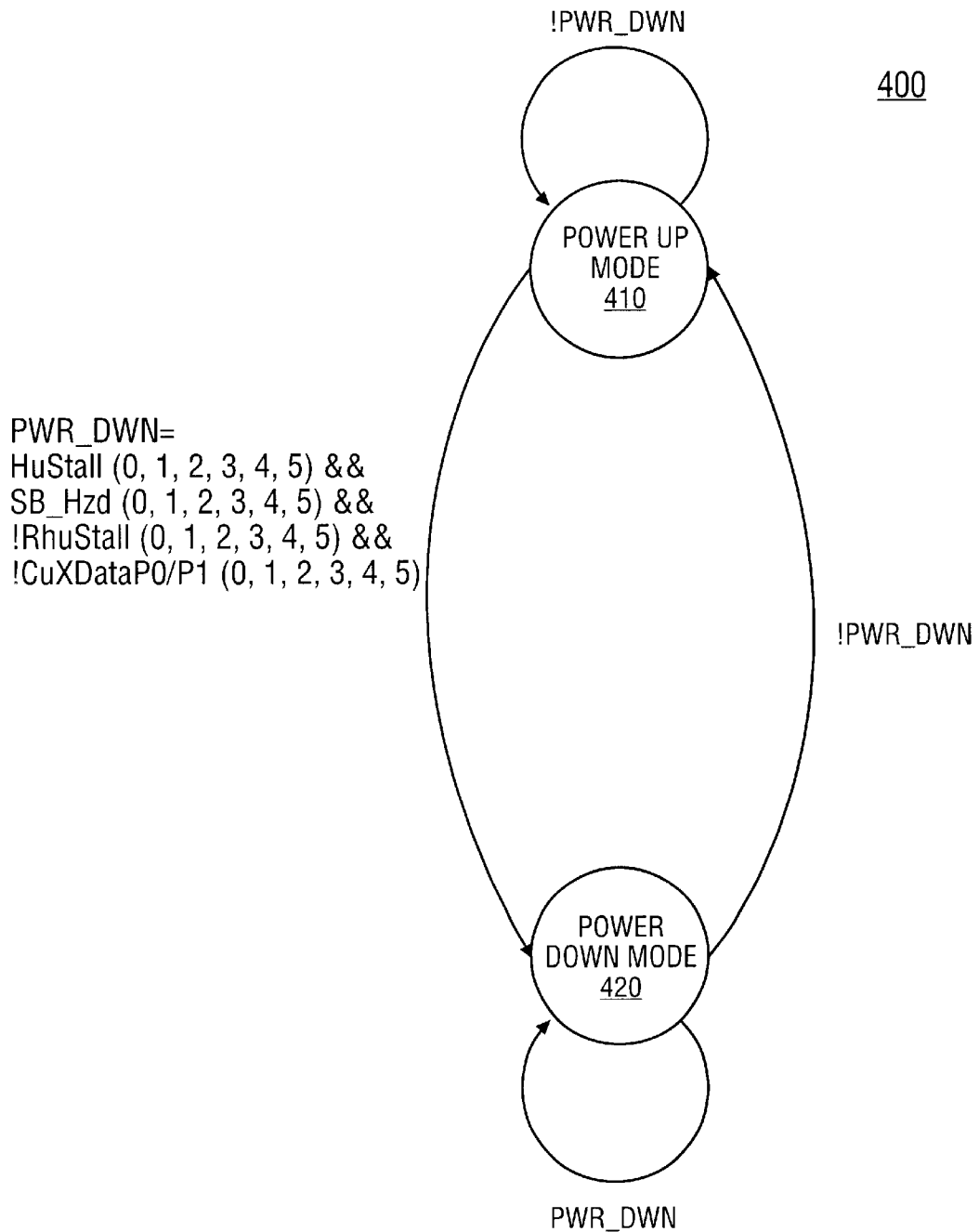
FIG. 4 is a state machine representing operation of one embodiment of a gating module in accordance with the present invention.

FIG. 4 is a state machine 400 representing the operation of a gating module 170 in accordance with the present invention. If state machine 400 is in power up state 410, it remains in power up state unless the following transition condition is detected in the indicated combination:
   PWR_DWN=HduStall (0, 1, 2, 3, 4, 5) && SB_Hzd (0,1,2,3,4,5) && !RhuStall (0,1,2,3,4,5) && !CuXDataP0/P1 (0,1,2,3,4,5).

Here, the numbers in parenthesis mean that each signal is monitored for the indicated set of clock cycles. When the logic condition is true, state machine 400 transitions from power up state 410 to power down state 420. Depending on the CLK signal being gated by gating module 170, this transition may take anywhere from 1 to a few clock cycles. Once in power down state 420, state machine 400 transitions to power up state 410 when any of the logic signals in PWR_DWN changes its logic state.

A system and method have been provided for reducing power consumption by gating a clock signal to execution logic on long latency stalls. Signals from a hazard unit and a cache unit are monitored to identify those long latency stalls for which termination of the stall condition can be predicted. The clock signal is decoupled from the execution logic when these signals persist for a selected delay interval. This delay interval eliminates power down transitions on short stalls. A power up transition is triggered when an imminent data return is indicated. The power up transition may be initiated as soon as the data return is detected to accommodate the latency of the clock coupling operation. If the data return does not eliminate the stall condition, a power down transition recurs when the hazard and cache unit signals are reestablished in their power down states for the selected interval. A power up transition may also be triggered if, during power down, a stall is detected that provides insufficient advance warning of the stall termination condition.

We claim:

1. A method for reducing power consumption in a processor comprising:
    monitoring a stall signal that is asserted if data requested by an execution unit is unavailable;
    monitoring a resource stall signal that is asserted if the processor is stalled by an unavailable resource;
    monitoring a data return signal that is asserted in advance of a load return; and
    decoupling a clock signal from the execution unit if the stall signal is asserted, the resource stall signal is not asserted, and the data return signal is not asserted for a selected number of clock cycles.

2. The method of claim 1, further comprising coupling the clock signal to the execution unit when the data return signal is asserted.

3. The method of claim 2, further comprising:
    determining whether a data return indicated by the data return signal eliminates a
    stall condition; and
    decoupling the clock signal from the execution unit if the stall condition is not
    eliminated.

4. A method for gating a clock signal on a cache miss comprising:
    monitoring a first indication of a data return from a load operation;
    monitoring a second indication that an instruction is stalled in an execution unit pending a data return;
    monitoring a third indication that an instruction is stalled awaiting a resource; and
    decoupling the clock signal from the execution unit when the first and third indications are absent and the second indication is present.

5. The method of claim 4, wherein decoupling the clock signal comprises decoupling the clock signal when the first indication is absent for a first number of clock cycles and the second indication is present for a selected number of clock cycles.

6. The method of claim 4, wherein monitoring a first indication comprises monitoring a data return signal that is asserted prior to a potential data return event.

7. The method of claim 4, wherein monitoring a second indication comprises monitoring an execution stall signal.

8. The method of claim 4, further comprising recoupling the clock signal to the execution unit when the first or the third indication is present or when the second indication is absent.

9. A system for reducing power consumption of an execution unit comprising:
    a cache management unit to monitor load operations and generate a data return signal in advance of a load return;
    a hazard management unit to track status data for a load operation and to generate a first stall signal for structural hazards and a second stall signal for data hazards; and
    a clock gate module to to curtail power to the execution unit when the second stall signal is asserted for n clock cycles, the data return signal is deasserted for m clock cycles, and the first stall signal is not asserted.

10. The system of claim 9, wherein the execution unit has an associated register file and scoreboard, the scoreboard to track data returns to registers of the register file, the scoreboard including a bit for each register that is set when the register is awaiting a data return.

11. The system of claim 10, wherein the hazard management unit is coupled to monitor instruction processing and to generate the second stall signal when the instruction consumes data in a register for which the scoreboard bit is set.

12. The system of claim 9, wherein n and m are equal.

13. A processor comprising:

an execution unit;

a cache management unit to generate a data return signal in advance of a data return;

a hazard management unit to assert a stall signal if data requested by the execution unit is unavailable and to assert a resource stall signal if the processor is stalled by an unavailable resource; and a clock gate module to curtail power to the execution unit responsive to the stall signal being asserted for n clock cycles, the resource stall signal not being asserted, and the data return signal not being asserted for m clock cycles.

14. The processor of claim 13, wherein the gate module includes first and second logic devices, the first logic device to assert a first signal when enabled by the stall signal and disabled by the data return signal or resource stall signal and the second logic device to assert a second signal when enabled by a state of the first signal in one or more pipe stages.

15. A system for reducing power consumption in an execution unit comprising:
    a cache management unit to generate a data return signal that precedes a load response by a selected interval;
    a hazard detection unit that asserts a stall signal when the processor is stalled by an interlock on a pending load return; and
    a resource hazard unit to generate a resource hazard signal when the execution unit is stalled by an unavailable resource; and
    means for gating a clock to decouple a clock signal from the execution unit when the stall signal is asserted and the resource hazard signal and data return signal are not asserted for selected intervals.

16. The system of claim 15, wherein the clock gating means includes first and second means, the first means to generate a first signal when the stall signal is asserted and the data return signal is not asserted and the second means to assert a clock gating signal when the first signal is asserted for a selected number of clock cycles.

* * * * *